United States Patent
Katahira

(10) Patent No.: US 7,423,397 B2
(45) Date of Patent: Sep. 9, 2008

(54) ELECTRIC POWER STEERING DEVICE

(75) Inventor: Youichi Katahira, Maebashi (JP)

(73) Assignee: NSK Steering Systems Co., Ltd., Tokyo (JP)

( * ) Notice: Subject to any disclaimer, the term of this patent is extended or adjusted under 35 U.S.C. 154(b) by 183 days.

(21) Appl. No.: 11/260,718

(22) Filed: Oct. 27, 2005

(65) Prior Publication Data
US 2006/0097676 A1      May 11, 2006

(30) Foreign Application Priority Data
Nov. 5, 2004      (JP) .............................. 2004-321551

(51) Int. Cl.
*H02P 7/00*      (2006.01)
(52) U.S. Cl. ..................... 318/432; 318/434
(58) Field of Classification Search ........................ None
See application file for complete search history.

(56) References Cited
U.S. PATENT DOCUMENTS
6,972,537 B2 * 12/2005 Nagase ...................... 318/432

FOREIGN PATENT DOCUMENTS
JP      3-186477 A      8/1991
JP      8-175405 A      7/1996

* cited by examiner

*Primary Examiner*—Lincoln Donovan
*Assistant Examiner*—Erick Glass
(74) *Attorney, Agent, or Firm*—Sidley Austin LLP

(57) ABSTRACT

An electric power steering device to control a motor based on steering torque generated in a steering shaft and supply an auxiliary steering force conforming to the steering torque to the steering system. The device judges the state wherein the command current value computed based on steering torque and the motor terminal voltage estimated based on a motor rotation number are deemed to be zero and, when the said state is judged, corrects the offset error of a motor current detecting circuit so that the actual motor terminal voltage is equal to zero. It is possible to prevent the auxiliary steering force based on offset error from being supplied to a steering system and eliminate the variation of steering torque.

9 Claims, 7 Drawing Sheets

ELECTRIC POWER STEERING DEVICE

This application is based on application No. 2004-321551 filed in Japan, the contents of which are hereby incorporated by reference.

BACKGROUND OF THE INVENTION

1. Field of the Invention

The present invention relates to an electric power steering device for a vehicle.

2. Prior Art

An electric power steering device for a vehicle is configured so that, when a driver handles a steering wheel, a controller of the power steering device detects steering torque caused by a steering shaft with a torque sensor and computes a command current value which is a control target of the motor current supplied to a motor which generates auxiliary steering force based on the detected steering torque. Also the controller detects a motor current actually flowing in the motor and feed it back to the command current value. The motor is driven by the controlled motor current value controlled so that the difference between the command current value and the detected motor current value is equal to zero and auxiliary steering force conforming to the steering torque is supplied to the steering system.

In an electric power steering wheel configured as stated above, whereas steering torque is not generated and essentially motor current is in the state of zero, a motor current detection signal is output due to the offset of a differential amplifier and the like constituting a motor current detector. When the motor current detection signal is fed back to the command current value, the motor is driven by the controlled motor current value based on the feedback and the auxiliary steering force output from the motor deviates to the extent corresponding to the offset. As a consequence, the disadvantage here is that, when a driver handles a steering wheel, the driver feels difference between steering to the left and steering to the right and the fluctuation of steering torque in the case of a brushless DC motor.

As a measure to overcome the disadvantage, it is proposed a means of outputting a detected motor current value as an offset correction value while steering torque is not generated and essentially motor current is in the state of not flowing and correcting the command current value with the offset correction value (refer to Japanese Patent Nos. 2914480 and 2847406).

FIG. 7 is an example of a block diagram showing the electronic control circuit 100 of an electric power steering device configured as stated above. In FIG. 7, a command current value computing unit 103 receives the steering torque T detected with a torque sensor 101 and the vehicle speed V detected with a vehicle speed sensor 102 and computes the command current value I which is the control target value of the motor current. The reference numeral 104 is an adder and it adds the command current value I to the detected motor current value ie corrected with an after-mentioned offset correction computing unit 109 and outputs the result as a controlled current value E.

A motor current detector 108 detects the motor current i actually flowing in a motor and the detected motor current value i is corrected with an offset correction value ΔI stored in the after-mentioned offset correction computing unit 109.

A drive controller 105 decides the duty ratio D of a pulse width modulation (PWM) signal to drive the motor based on a controlled current value E which has been inputted from adder 104. A motor drive circuit 106 drives the motor 107 based on the decided duty ratio D.

The offset correction computing unit 109 stores as an offset value ΔI which is detected motor current value i outputted from the motor current detector 108 in the state wherein a command current value I is equal to zero (0), namely motor current does not flow essentially. Thereafter the unit 109 corrects the detected motor current value i with the offset value ΔI and outputs the corrected detected motor current value ie to the adder 104.

By the above configuration, when a driver handles a steering wheel, since the detected motor current value i is corrected with the offset correction value ΔI and fed back, the controlled motor current value is corrected with the offset value and therefore it is possible to eliminate the disadvantageous situation wherein the driver feels difference between steering to the left and steering to the right and the fluctuation of steering torque in the case of a brushless DC motor.

In recent years, the size of a vehicle on which an electric power steering device is mounted is getting larger, thus the torque of a motor required in the electric power steering device is increasing, and the motor current and the output of the motor are also increasing. However, in a microcomputer (CPU) constituting the electronic control circuit of the electric power steering device, the resolution of an A/D converter to digitally convert a detected motor current value is still 10 bits and therefore the resolution becomes insufficient when the motor current increases. Further, since the torque constant increases, the torque per bit used in the CPU also increases.

As a result, the variation of the torque caused by the deviation of one least significant bit in the ten-bit resolution, namely torque ripples, comes close to the extent that a driver handling a steering wheel can feel the variation and thus even the error of about one or two bits that has not heretofore been a problem has not been ignored.

In particular, since the offset error of a motor current detector, even with the error of about one to three bits, directly affects torque ripples, an electric power steering device of a high output may possibly generate vibration and noise.

In addition, the offset error of a motor current detector must be corrected for each electric power steering device since the variation of the thermal characteristics of circuit elements is large. Nevertheless, it is not realistic to correct the offset error over the full temperature range (−40° C. to 120° C.) at the time of the production from the view point of the workload. Another problem is that the change of offset error caused by aging must also be taken into consideration.

SUMMARY OF THE INVENTION

The primary object of the present invention is to provide a novel electric power steering device to control a motor to assist steering based on the steering torque loaded on a steering shaft when a driver handles a steering wheel and to supply an auxiliary steering force conforming to the steering torque to the steering system.

Another object of the present invention is to provide a novel electric power steering device providing a control unit to compute a command current value that is the control target value of motor current based on the steering torque loaded on a steering shaft, to control the motor current so that the difference between the command current value and the detected motor current value is equal to zero, and to supply a auxiliary steering force conforming to the steering torque to the steering system.

Yet another object of the present invention is to provide a novel electric power steering device providing a control unit to estimate the voltage between motor terminals based on the command current value computed based on steering torque and the rotation number of a motor, to correct the offset error of a motor current detection circuit so that the actual voltage between the motor terminals is equal to zero in the state wherein the estimated voltage between the motor terminals is equal to zero, and to eliminate the variation of the steering torque based on the offset error. Then, an auxiliary steering force conforming to the steering torque is supplied to the steering system and thus the steering smoothness can be improved.

The other objects of the present invention will be clarified from the detailed explanations of the present invention referring to the attached drawings.

DETAILED DESCRIPTION OF THE PREFERRED EMBODIMENTS

The embodiments according to the present invention are explained hereunder. An electric power steering device in the embodiments according to the present invention uses a brushless DC motor as the motor to generate auxiliary steering force. The brushless DC motor is provided with armature coils as the stator and permanent magnets as the rotor and configured so as to decide the timing of the DC current flowing in the coil of the magnetic pole corresponding to the position of a permanent magnet so that the magnetic field of the permanent magnet and the magnetic field formed by an armature coil are perpendicular to each other in accordance with the position of the rotation of the permanent magnet.

To that end, a rotation sensor to detect the positions of the rotation of the permanent magnets is disposed on the stator and the necessary number of the detecting elements of the sensor is proportional to the number of the phases of the motor, namely the number of the detecting elements is three in the case of a three-phase motor. A Hall sensor or the like is used as a rotation sensor.

Figure 1:
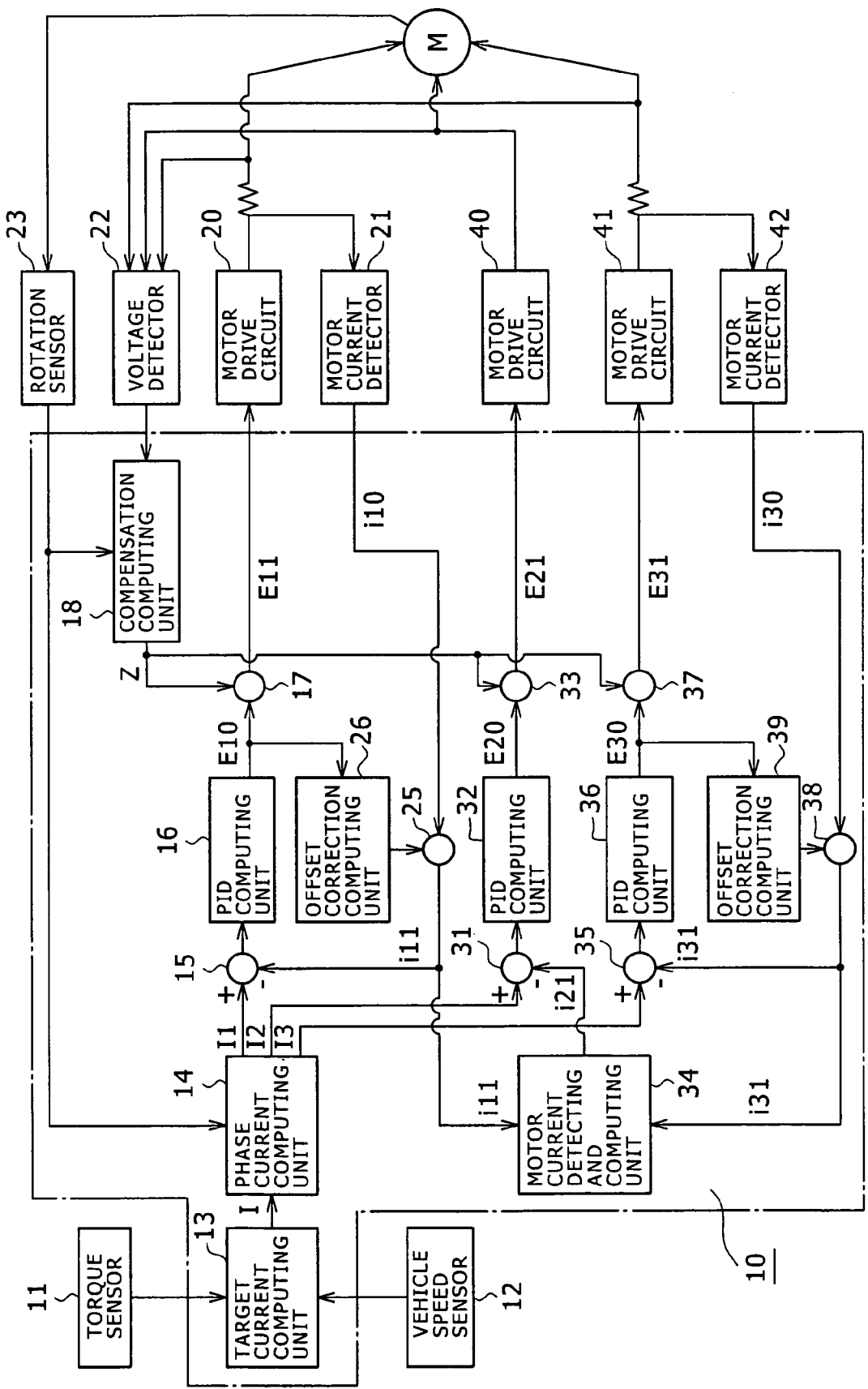
FIG. 1 is a block diagram schematically explaining the electronic control circuit of an electric power steering device and the neighboring circuit elements in an embodiment according to the present invention, and the operation thereof.

FIG. 1 is a block diagram schematically explaining the electronic control circuit 10 of an electric power steering device and the neighboring circuit elements in an embodiment according to the present invention, and the operation thereof. In FIG. 1, the steering torque detected with a torque sensor 11 and the vehicle speed detected with a vehicle speed sensor 12 are input into a target current computing unit 13 and the control target value I of motor current is computed. The computed control target value of motor current is input into a phase current computing unit 14 and converted into three phase current values I1, I2 and I3 corresponding to the three phases (U phase, V phase and W phase) of a brushless DC motor in accordance with the electrical angle of a motor M detected with a rotation sensor 23 which is a detector detecting motor rotation numbers detector.

In a comparator 15, the detected motor current value i11 is fed back to the aforementioned phase current value I1 and thus feedback control is carried out. Motor current value i11 is obtained by an adder 25 adding the other data to the detected motor current value i10 outputted from an aftermentioned motor current detector 21.

Figure 2:
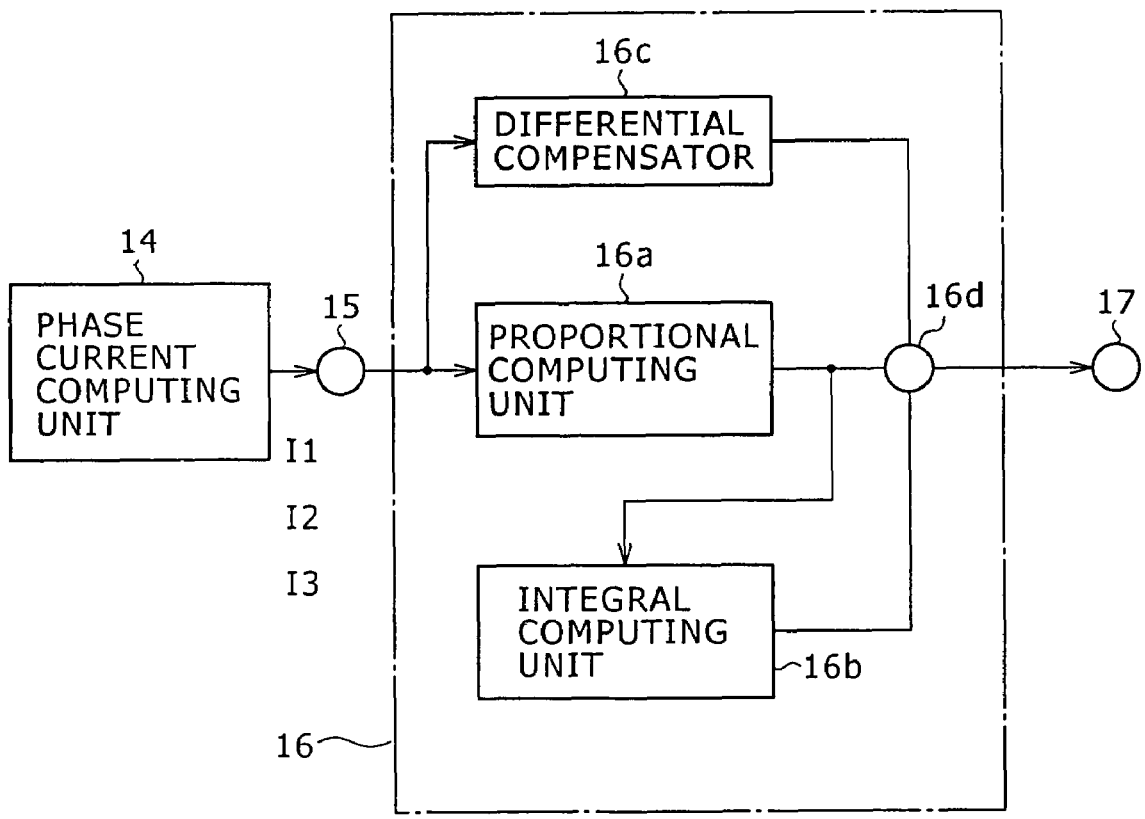
FIG. 2 is a block diagram explaining the configuration of a PID computing unit in an electronic control circuit.

A PID computing unit 16, as concretely shown in FIG. 2, comprises a proportional computing unit 16a, an integral computing unit 16b, a differential compensator 16c, and an adder 16d. The proportional computing unit 16a outputs a proportional value proportional to the difference between the phase current value I1 and the detected motor current value i1. Further, the output from the proportional computing unit 16a is integrated with the integral computing unit 16b in order to improve the characteristics of the feedback system and is output. The differential compensator 16c outputs the differential value of the phase current value I1 in order to increase the response speed of the motor current to the phase current value I1. The adder 16d adds the outputs from the proportional computing unit 16a, the integral computing unit 16b and the differential compensator 16c, and outputs the resultant value as a control voltage value between motor terminals (hereunder referred to as "control voltage value) E10.

An adder 17 adds a compensation value Z output from a compensation computing unit 18 to the aforementioned control voltage value E10 and outputs the control voltage value E11, produced by adding the compensation value Z, to a motor drive circuit 20 of the latter stage.

The compensation computing unit 18 accepts the input voltage applied to the motor M detected by a voltage detector 22, and the electrical angle detected by the rotation sensor 23 to detect the rotation angle of the motor M and computes the compensation value Z to compensate counterelectromotive force generated in the motor including higher harmonic wave ripples contained in motor current and others and outputs the compensation value Z to the adder 17.

The motor drive circuit 20 controls motor drive voltage based on the control voltage value E11. The motor is driven with the motor drive circuit by sequentially driving the three phases (U phase, V phase and W phase) of the brushless DC motor at the phases shifting by 60 degrees. The detail of the control is explained later.

The motor current detector 21 detects the current flowing in the motor M and outputs the detected current value i10 to the adder 25. The voltage detector 22 detects the voltage applied to the motor M and outputs the detected voltage value to the compensation computing unit 18.

An offset correction computing unit 26 computes the correction value to correct the offset error of the motor current detected with the motor current detector 21. This will be explained later in detail.

The above configuration is the circuit for the phase current value I1 output from the phase current computing unit 14. The circuit for the phase current value I3 is exactly the same and comprises a comparator 35, a PID computing unit 36, an adder 37, a motor drive circuit 41, a motor current detector 42, an adder 38, and an offset correction computing unit 39.

The circuit for the phase current value I2 is similar to the circuit for the phase current value I1 in terms of being equipped with a comparator 31, a PID computing unit 32 and a motor drive circuit 40. However, the circuit for the phase current value I2 is different from the circuit for the phase current value I1, that is, the former circuit is equipped with a motor current detecting and computing unit 34 in place of the motor current detector 21, the motor current detecting and computing unit 34 receives as the inputs the output i11 from the motor current detector 21, which has been corrected by the offset correction value of the circuit of the phase current value I1 and the output i31, from the motor current detector 42, which has been corrected by the offset correction value of the circuit of the phase current value I3. The output i21 from the motor current detecting and computing unit 34 is inputted into the comparator 31, the output i21 and the phase current value I2 output from the phase current computing unit 14 are computed in the comparator 31. Then the computed value is input into the PID computing unit 32 and thus the phase current value I2 is corrected by the detected motor current value which is corrected by the offset correction values.

The above difference appears in the case of the technologies commonly used in the three phase control of a brushless DC motor except that the offset correction value is used for correction.

In addition, the electronic control circuit 10 is provided with a temperature sensor to detect the temperature of the electronic control circuit 10 though it is not shown in the figure. The purpose is to apply an offset correction process when a prescribed level of temperature change is detected between the temperature of the electronic control circuit 10 at the last control process and the temperature of the electronic control circuit 10 at the present control process.

A motor terminal voltage controller according to the present invention comprises, as described above, a phase current computing unit 14, comparators 15, 31 and 35, PID computing units 16, 32 and 36, offset correction computing units 26 and 39, a rotation sensor 23, and others.

Then the motor terminal voltage controller judges the state wherein the motor terminal voltage value is deemed to be zero (the state wherein steering is not operated) based on the target current value that is the control target value of motor current when a motor is driven and the rotation number of the motor (the electrical angle of the motor M) detected with the rotation sensor 23; and computes and corrects the offset error of the detected motor current value with the offset correction computing units 26 and 39 so that the motor terminal voltage value is equal to zero in the state wherein the motor terminal voltage value is deemed to be zero.

The operation in the above configuration is briefly explained here under. The control target value I of motor current is computed with the target current computing unit 13 based on the steering torque detected with the torque sensor 11 and the vehicle speed detected with the vehicle speed sensor 12 and the control target value I is converted into three phase current values I1, I2 and I3 that are subjected to on/off control in accordance with the electrical angle of the motor M detected by the rotation sensor 23 in the phase current computing unit 14.

The phase current value I1 is converted into a control voltage value E10 by a prescribed control amount being regulated with the PID computing unit 16, thereafter the compensation value Z output from the compensation computing unit 18 is added to the converted control voltage value E10, the motor drive circuit 20 is controlled by the control voltage value E11 obtained by adding the compensation value Z, and thus the motor M is driven. The motor current value i10 detected with the motor current detector 21 is corrected by the offset correction value output from the offset correction computing unit 26 in the adder 25, and the corrected motor current value i11 is fed back to the phase current value I1 through the comparator 15.

The phase current values I2 and I3 converted with the phase current computing unit 14 are also processed likewise and, in the case of the aforementioned embodiment (three phase current), the magnetic poles of U phase, V phase and W phase are sequentially exited at the phases shifting by 60 degrees, and thus the motor rotates in conformity with the steering torque and the vehicle speed.

Figure 3:
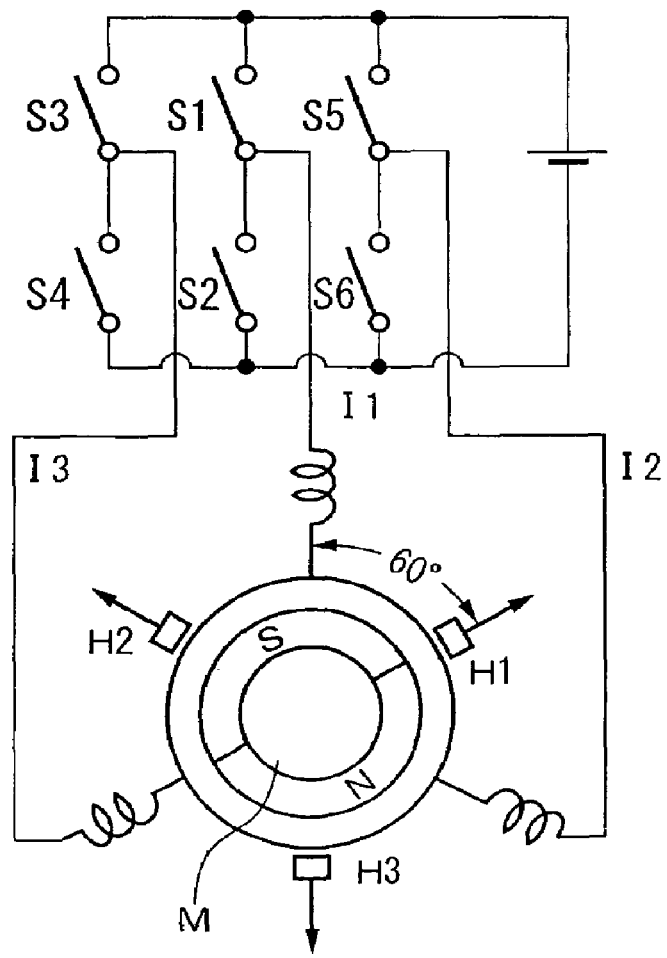
FIG. 3 is a circuit diagram schematically explaining the motor drive circuit of a brushless DC motor.

FIG. 3 is a circuit diagram schematically explaining a motor drive circuit of a brushless DC motor. The motor drive circuits 20, 40 and 41 in FIG. 1 are inverter circuits comprising the combination of six switching elements in total, more specifically comprising the combination of S1 and S2, the combination of S3 and S4, and the combination of S5 and S6, respectively. Further, the rotation sensor 23 in FIG. 1 to detect the electrical angle of the motor M comprises three detecting elements (Hall sensors) H1, H2 and H3. Then the detecting elements H1, H2 and H3 are arranged so as to be shifted from the neutral axis of each phase by 60 degrees as shown in FIG. 3 and the phase current values I1, I2 and I3 are subjected to on/off control in accordance with the leading edges and the trailing edges of the output signals of detecting elements H1, H2 and H3 to detect the electrical angle of the motor M.

Figure 4:
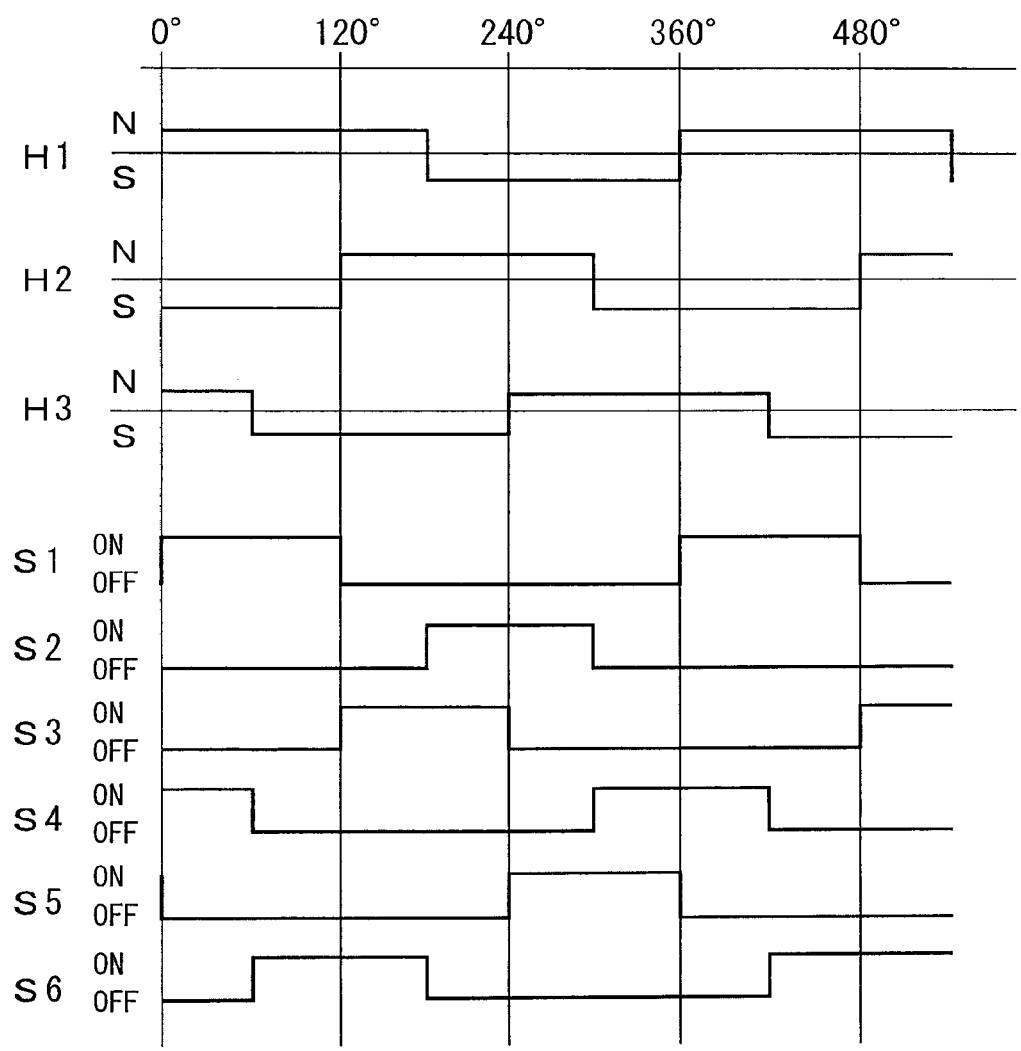
FIG. 4 is a diagram showing the timing of the leading edges and the trailing edges of the detecting elements H1, H2 and H3 of a rotation sensor and the timing of the on/off control of the switching elements S1 to S6 of a motor drive circuit.

FIG. 4 is a diagram showing the timing of the leading edges and the trailing edges of the output signals of detecting elements H1, H2 and H3 of the rotation sensor 23 and the timing of the on/off control of the switching elements S1 to S6 constituting the motor drive circuits 20, 40 and 41. The switching element S1 is turned on at the leading edge of the output signals of detecting element H1 and turned off at the leading edge of the output signals of detecting element H2 and thus the U phase is excited. The switching element S4 is turned on up to the time when the rotation advances from the leading edge of the output signals of detecting element H1 by 60 degrees and the switching element S6 is turned on after the 60 degree rotation, the V and W phases are excited so that each of them takes an opposing polarity, the two phases are excited simultaneously, and thus the motor M can efficiently be driven. When the rotation of the motor M is reversed, the relationship of on/off of the switching elements S1 to S6 corresponding to the leading edges and the trailing edges of the output signals of detecting elements H1 to H3 may be reversed.

The offset correction computing units 26 and 39 that constitute the offset correction device are explained hereunder. As it has been explained in Prior Art, in the case of the electronic control circuit of a conventional electric power steering device, the motor current control target value I has been corrected by using the detected motor current value i detected in the state wherein motor current does not flow (the state wherein steering torque is not generated) as the offset error. However, by this method, when the detected motor current value (an analog value) is converted into a digital value with the A/D converter of the electronic control circuit, due to the insufficient resolution of the A/D converter, there is the possibility that the offset error becomes torque ripples and vibration and noise are caused. Therefore, it is not appropriate to use the detected motor current value i as the offset error. In this light, in the present invention, the offset error is corrected with the offset correction computing units 26 and 39 that are explained hereunder.

The offset correction computing units 26 and 39 are the computing units to carry out the after-mentioned computation. That is, the offset correction computing units 26 and 39 are the computing units that set the state wherein the outputs from the PID computing units 16 and 36 are deemed to be zero (0) (the outputs of the phase current computing unit 14 are zero (0) and the output of the compensation computing unit 18 is zero (0)) when a driver does not handle a steering wheel (when the output of the target current computing unit 13 is within a certain threshold value, the rotation number of the motor is also within a certain threshold value, and a prescribed time has lapsed), and compute the correction value of offset error.

That is, the offset correction computing units 26 and 39 sample the outputs of the PID computing units 16 and 36 (PID computing units scarcely affected by disturbing noise) after the lapse of a prescribed time. Then the average value of a prescribed number of the sampled outputs is computed, and whether or not the average value is zero (0) or within a prescribed range including zero (0) as the center thereof is judged. Then when the average value exceeds the prescribed range, it is concluded that offset error is generated in either of the motor current detectors 21 and 42, and the least significant bit 1 (1 LSB), which is the smallest resolution of a digital value, (or may be 1 LSB and over) is added or subtracted as the correction amount $\Delta m$ to or from the outputs (a digital value after subjected to A/D conversion) of the motor current detectors 21 and 42.

Thereafter, the following processes are executed, that is, the sampling of the outputs of the PID computing units 16 and 36, the computation of the average value of the sampled outputs, the judgment of whether or not the average value is zero (0) or within a prescribed range including zero (0) as the center thereof, and the addition or subtraction of the least significant bit 1 as the correction amount $\Delta m$ to or from the outputs of the motor current detectors 21 and 42, when the average value is not within the prescribed range are repeated until the average value of the sampled outputs falls within the prescribed range. Then at the time when the average value of the sampled outputs falls within the prescribed range, the correction of the offset error of the motor current detectors 21 and 42 is completed.

Here, it is also possible that the offset correction computing units 26 and 39 are provided with memories that are the means of storing offset correction values and the offset correction values computed and stored at the last time are used as the offset correction values at the time when the electric power source is turned on again.

Figure 5:
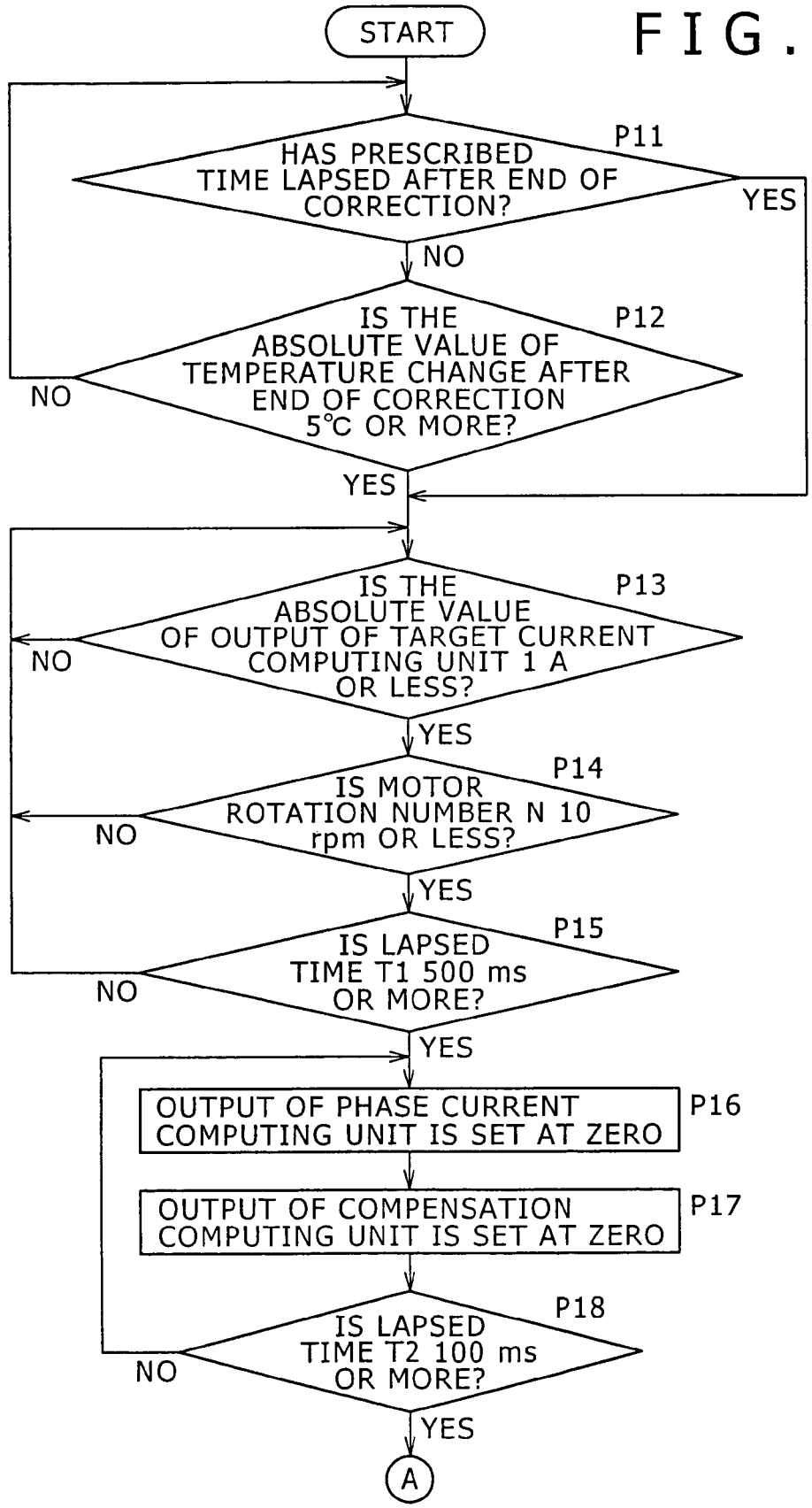
FIG. 5 is a flowchart explaining the correction processes of the offset error of a detected motor current value detected with a motor current detector.
Figure 6:
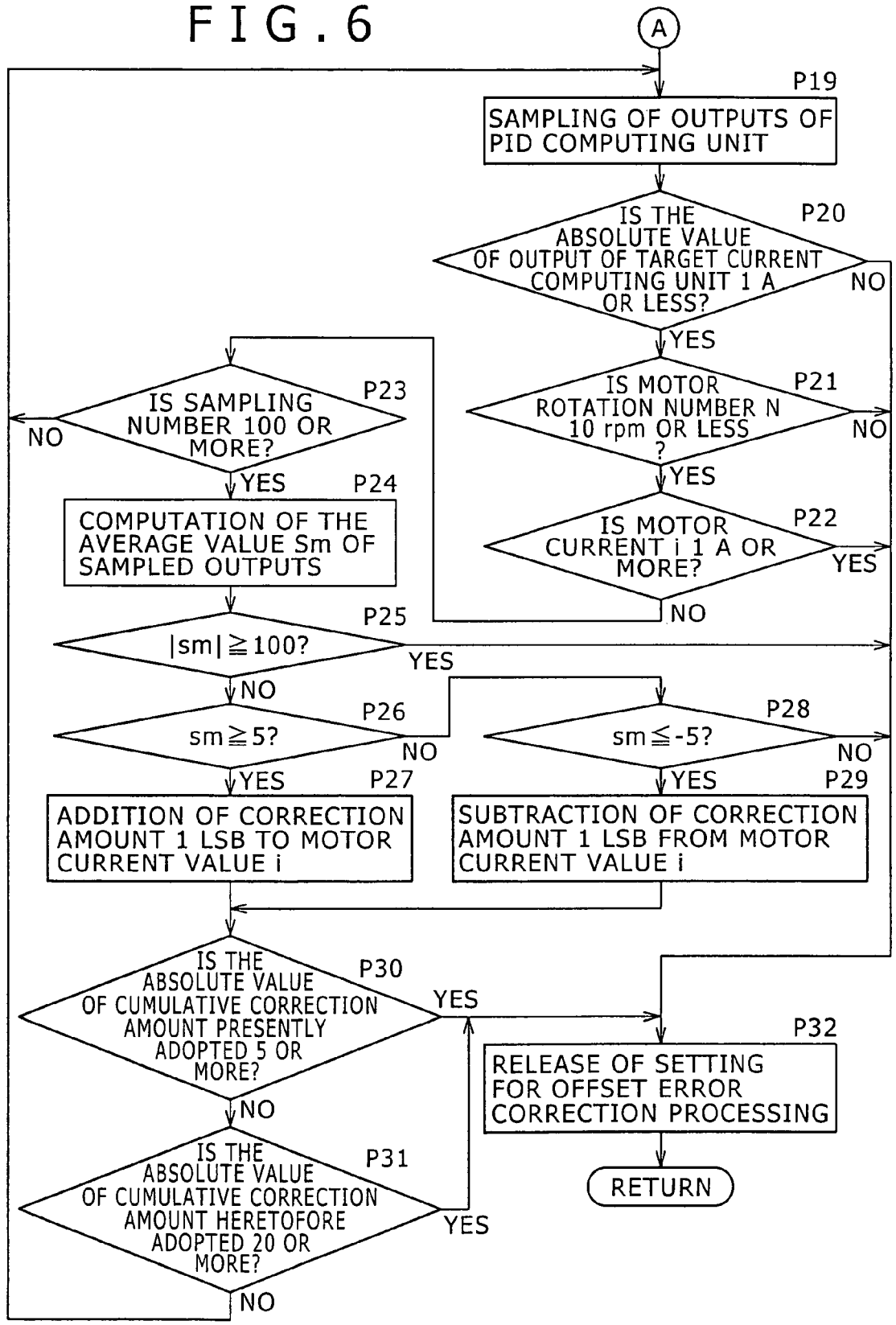
FIG. 6 is a flowchart succeeding to FIG. 5 explaining the correction processes of the offset error of a detected motor current value detected with a motor current detector.
Figure 7:
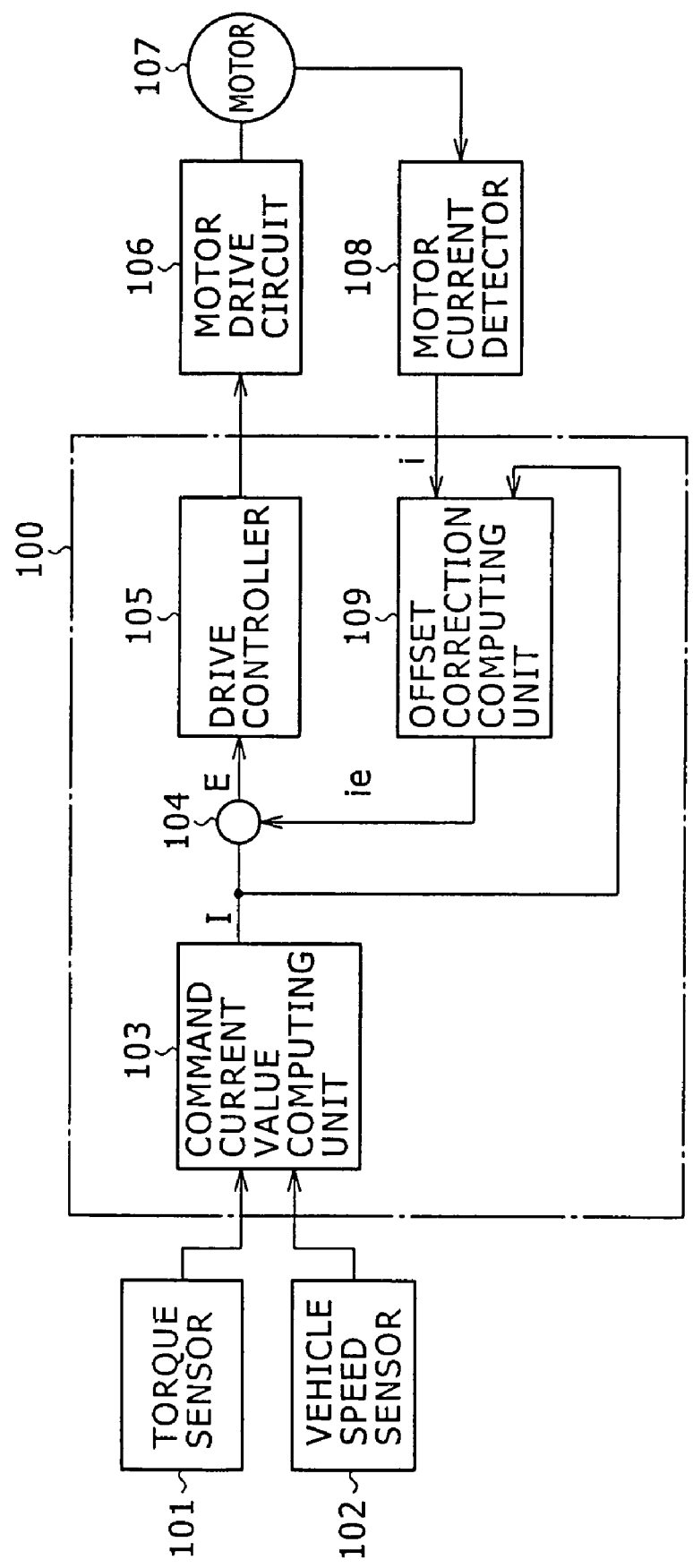
FIG. 7 is a block diagram showing the electronic control circuit of a conventional electric power steering device.

FIGS. 5 and 6 are flowcharts explaining the processes of correcting the offset error of a detected motor current value detected with either of the aforementioned motor current detectors.

Firstly, after finishing the correction of an offset error, whether or not a prescribed time (1,800 sec., for example) has lapsed is judged (step P11). When the prescribed time does not lapse yet, whether or not the absolute value of the temperature change, after the correction, of the operational amplifier constituting the motor current detector is 5° C. or more is judged (step P12). When the prescribed time has lapsed in the judgment of the step P11 or the absolute value of the temperature change is 5° C. or more in the judgment of the step P12, the flow goes to step P13. In contrast, when the temperature change is not 5° C. or more in the judgment of the step P12, the flow goes back to the step P11.

Whether or not the absolute value of the output I of the target current computing unit is not more than one ampere ($|I| \leq 1$ A) is judged (step P13). When the output I of the target current computing unit satisfies the expression $|I| \leq 1$ A, whether or not the rotation number N of the motor is not more than 10 rpm ($N \leq 10$ rpm) is judged (step P14) and, when the result of the judgment is that the rotation number N of the motor satisfies the expression $N \leq 10$ rpm, whether or not the lapsed time T1 during which the state is maintained is not less than 500 ms. ($T1 \geq 500$ ms.) is judged (step P15). When the results of the judgments in the steps P13, P14 and P15 are negative, that means that a driver is handling a steering wheel, therefore the flow does not proceed to the next process of correcting offset error, the process is stopped, and the flow goes back to the step P13. In contrast, when the results of the judgments in the steps P13, P14 and P15 are positive, the flow goes to step P16.

The outputs of the phase current computing unit and the compensation computing unit are set at zero (0) (steps P16 and P17) and the state is kept for 100 ms. or longer. That is, whether or not the lapsed time T2 is not less than 100 ms. ($T2 \geq 100$ ms.) is judged (step P18). When the lapsed time T2 satisfies the expression T2<100 ms, the flow goes back to the step P16. In contrast, when the lapsed time T2 satisfies the expression $T2 \geq 100$ ms, the sampling of the outputs of the PID computing unit is commenced (step P19).

The conditions of correcting offset error are judged. That is, whether or not the absolute value of the output I of the target current computing unit is not more than one ampere ($|I| \leq 1$ A) is judged (step P20). When the output I of the target current computing unit satisfies the expression $|I| \leq 1$ A, whether or not the rotation number N of the motor is not more than 10 rpm ($N \leq 10$ rpm) is judged (step P21) and, when the result of the judgment is that the rotation number N of the motor satisfies the expression $N \leq 10$ rpm, whether or not the motor current i detected with the motor current detector is not less than one ampere ($i \geq 1$ A) is judged (step P22).

When the results of the judgments in the steps P20 and P21 are negative, the correction process is stopped and the flow goes to step P32. When the motor current i satisfies the expression $i \geq 1$ A as a result of the judgments in the step P22, it is concluded that abnormal noise and the like have been mixed in the feedback system, the process of correcting offset error is stopped, and the flow goes to the step P32.

In contrast, when the motor current i satisfies the expression i<1 A as a result of the judgment in the step P22, whether or not the number S of the sampling of the outputs of the PID computing unit is not less than a prescribed number is judged, here whether or not the sampling number S is not less than 100 is judged (step P23). Then, when the sampling number S is less than 100, the flow goes back to the step P19 in order to continue the sampling.

When the number S of the sampling of the outputs of the PID computing unit is not less than a prescribed number, here the sampling number S is not less than 100, as a result of the judgment in the step P23, the average value Sm of the sampled outputs is computed (step P24), and whether or not the absolute value of the average value Sm is not less than 100 ($|Sm| \geq 100$) is judged (step P25). When the absolute value of the average value Sm is not less than 100 ($|Sm| \geq 100$) as a result of the judgment, it is concluded that abnormal noise and the like have been mixed in the feedback system, the process of correcting offset error is stopped, and the flow goes to the step P32.

When the average value Sm is less than 100 ($|Sm|<100$) as a result of the judgment in the step P25, whether or not the average value Sm is not less than 5 ($Sm \geq 5$) is judged (step P26). When the average value Sm is not less than 5 ($Sm \geq 5$) as a result of the judgment in the step P26, one bit that is the least unit used in a CPU (least significant bit, LSB) is added as the correction value $\Delta m$ to the motor current i (a digital value after subjected to A/D conversion) detected with a current detector in order to correct offset error (step P27) and the flow goes to step P30.

In contrast, when the average value Sm is less than 5 (Sm<5) as a result of the judgment in the step P26, whether or not the average value Sm of the samples of the outputs of the PID computing unit is not more than −5 (Sm≦−5) is judged (step P28). When the average value Sm of the sampled outputs is more than −5 (Sm>−5) as a result of the judgment, the average value Sm of the sampled outputs satisfies the expression −5<Sm<5, hence it is concluded that the target motor drive voltage has converged at zero or in a prescribed range including zero (0) as the center thereof, and then the flow goes to the step P32 in order to terminate the processes.

When the average value Sm of the sampled outputs is not more than −5 (Sm≦−5) as a result of the judgment in the step P28, one bit is subtracted as the correction value Δm from the motor current i (a digital value after subjected to A/D conversion) detected with a current detector in order to correct offset error (step P29) and the flow goes to the step P30.

Whether or not the absolute value of the integrated value ΔM of the presently applied correction values is not less than 5 (|ΔM|≧5) is judged (step P30). When the absolute value of the integrated value ΔM of the presently applied correction values is not less than 5 (|ΔM|≧5) as a result of the judgment in the step P30, it is concluded that abnormal noise and the like have been mixed in the feedback system, the process of correcting offset error is stopped, and the flow goes to the step P32.

In contrast, when the absolute value of the integrated value ΔM of the correction values is less than 5 (|ΔM|<5) as a result of the judgment in the step P30, whether or not the absolute value of the integrated value ΔMA of the heretofore applied correction values is not less than 20 (|ΔMA|≧20) is judged (step P31).

When the absolute value of the integrated value ΔMA of the correction values is not less than 20 (|ΔMA|≧20) as a result of the judgment in the step P31, it is concluded that abnormal noise and the like have been mixed in the feedback system, the process of correcting offset error is stopped, and the flow goes to the step P32. In contrast, when the absolute value of the integrated value ΔMA of the correction values is less than 20 (|ΔMA|<20) as a result of the judgment in the step P31, the flow goes back to the step P19 and the processes succeeding to the process to sample the outputs of the PID computing unit are resumed.

In the step P32, since the processes of correcting offset error are finished or discontinued on the middle of the processes, the output (0) of the phase current computing unit and the output (0) of the compensation computing unit set at the steps 16 and 17 for the correction processes are released and the flow returns to the main routine.

The present invention judges the state where in at least steering operation is not based on a target current value and a motor rotation number, namely the state wherein the motor terminal voltage value is deemed to be zero and computes the offset correction value to correct a detected motor current value so that the motor terminal voltage value is equal to zero.

In the computation of the offset correction value, since the offset correction value is repeatedly computed at the unit of one bit that is the smallest unit used in a CPU in an electronic control circuit and can converge in a prescribed range, it is possible to precisely correct torque ripples and eliminate the possibility of the generation of vibration and noise.

Further, since the computation of the offset correction value can be carried out inside a CPU in an electronic control circuit at any time in the state wherein the target motor terminal voltage value is deemed to be zero, the influence of the variation of the thermal characteristics of circuit elements, the change of offset error caused by aging, and the like can be avoided.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electric power steering device, comprising:
   a torque sensor to detect at least steering torque generated in a steering shaft;
   a target current computing unit to compute a target current value for regulating motor current based on the detected steering torque;
   motor drive circuits to drive a motor that supplies auxiliary steering force;
   motor current detectors to detect motor current value in said motor;
   a motor rotation number detector to detect the rotation number of said motor;
   a motor terminal voltage controller to control the voltage between the terminals of said motor based on the difference between said computed target current value and said detected motor current value; and
   an offset correction device to correct a detected motor current value, wherein said offset correction device adds or subtracts a minimum correction amount to or from said detected motor current value and said calculations are repeated until a computed average value of sampled target motor terminal voltage values falls within a prescribed range including zero therein, when said motor terminal voltage controller judges the state wherein said motor terminal voltage value is deemed to be zero.

2. An electric power steering device according to claim 1, wherein said offset correction device, after computing the preceding offset correction value and then staying for a prescribed period of time, commences the computation of the succeeding offset correction value.

3. An electric power steering device according to claim 1, wherein said offset correction device, after computing the preceding offset correction value, commences the computation of the succeeding offset correction value when a prescribed degree of temperature change is detected.

4. An electric power steering device, comprising:
   a torque sensor to detect at least steering torque generated in a steering shaft;
   a target current computing unit to compute a target current value for regulating motor current based on the detected steering torque;
   motor drive circuits to drive a motor that supplies auxiliary steering force;
   motor current detectors to detect motor current value in said motor;
   a motor rotation number detector to detect the rotation number of said motor;
   a motor terminal voltage controller to control the voltage between the terminals of said motor based on the difference between said computed target current value and said detected motor current value; and
   an offset correction device to correct a detected motor current value so that a target motor terminal voltage value is equal to zero when said motor terminal voltage controller judges the state wherein said motor terminal voltage value is deemed to be zero, wherein said offset correction device concludes that a driver is handling a steering wheel and stops the computation of the offset correction value when the target current value output from the target current value computing unit deviates from a prescribed range or when the motor rotation number deviates from a prescribed range during the computation of the offset correction value.

5. An electric power steering device, comprising:
a torque sensor to detect at least steering torque generated in a steering shaft;
a target current computing unit to compute a target current value for regulating motor current based on the detected steering torque;
motor drive circuits to drive a motor that supplies auxiliary steering force;
motor current detectors to detect motor current value in said motor;
a motor rotation number detector to detect the rotation number of said motor;
a motor terminal voltage controller to control the voltage between the terminals of said motor based on the difference between said computed target current value and said detected motor current value; and
an offset correction device to correct a detected motor current value so that a target motor terminal voltage value is equal to zero when said motor terminal voltage controller judges the state wherein said motor terminal voltage value is deemed to be zero,
wherein said offset correction device concludes that abnormal noise and the like have been mixed in the current control feedback system and stops the computation of the offset correction value when the detected motor current value deviates from a prescribed range during the computation of the offset correction value.

6. An electric power steering device, comprising:
a torque sensor to detect at least steering torque generated in a steering shaft;
a target current computing unit to compute a target current value for regulating motor current based on the detected steering torque;
motor drive circuits to drive a motor that supplies auxiliary steering force;
motor current detectors to detect motor current value in said motor;
a motor rotation number detector to detect the rotation number of said motor;
a motor terminal voltage controller to control the voltage between the terminals of said motor based on the difference between said computed target current value and said detected motor current value; and
an offset correction device to correct a detected motor current value so that a target motor terminal voltage value is equal to zero when said motor terminal voltage controller judges the state wherein said motor terminal voltage value is deemed to be zero,
wherein said offset correction device computes an offset correction value to correct a detected motor current value so that the computed average value of the target motor terminal voltage values sampled in a prescribed number is equal to zero; and
wherein said offset correction device concludes that abnormality is caused in the current control feedback system and stops the computation of the offset correction value when the average value of the number of the samples of the target motor terminal voltage values deviates from a prescribed range.

7. An electric power steering device, comprising:
a torque sensor to detect at least steering torque generated in a steering shaft;
a target current computing unit to compute a target current value for regulating motor current based on the detected steering torque;
motor drive circuits to drive a motor that supplies auxiliary steering force;
motor current detectors to detect motor current value in said motor;
a motor rotation number detector to detect the rotation number of said motor;
a motor terminal voltage controller to control the voltage between the terminals of said motor based on the difference between said computed target current value and said detected motor current value; and
an offset correction device to correct a detected motor current value so that a target motor terminal voltage value is equal to zero when said motor terminal voltage controller judges the state wherein said motor terminal voltage value is deemed to be zero,
wherein said offset correction device concludes that abnormal noise and the like have been mixed in the current control feedback system and stops the computation of the offset correction value when the integrated value of the presently computed offset correction values deviates from a prescribed range.

8. An electric power steer device, comprising:
a torque sensor to detect at least steering torque generated in a steering shaft;
a target current computing unit to compute a target current value for regulating motor current based on the detected steering torque;
motor drive circuits to drive a motor that supplies auxiliary steering force;
motor current detectors to detect motor current value in said motor;
a motor rotation number detector to detect the rotation number of said motor;
a motor terminal voltage controller to control the voltage between the terminals of said motor based on the difference between said computed target current value and said detected motor current value; and
an offset correction device to correct a detected motor current value so that a target motor terminal voltage value is equal to zero when said motor terminal voltage controller judges the state wherein said motor terminal voltage value is deemed to be zero,
wherein said offset correction device concludes that abnormality is caused in the current control feedback system and stops the computation of the offset correction value when the cumulative value of the offset correction values computed from the past to the present deviates from a prescribed range.

9. An electric power steering device, comprising:
a torque sensor to detect at least steering torque generated in a steering shaft;
a target current computing unit to compute a target current value for regulating motor current based on the detected steering torque;
motor drive circuits to drive a motor that supplies auxiliary steering force;
motor current detectors to detect motor current value in said motor;
a motor rotation number detector to detect the rotation number of said motor;

a motor terminal voltage controller to control the voltage between the terminals of said motor based on the difference between said computed target current value and said detected motor current value; and an offset correction device to correct a detected motor current value so that a target motor terminal voltage value is equal to zero when said motor terminal voltage controller judges the state wherein said motor terminal voltage value is deemed to be zero, wherein said offset correction device is equipped with a memory means to store an offset correction value and uses the offset correction value computed and stored previously as the offset correction value used when the electric power source is turned on again.

* * * * *

UNITED STATES PATENT AND TRADEMARK OFFICE
CERTIFICATE OF CORRECTION

PATENT NO.      : 7,423,397 B2                                      Page 1 of 1
APPLICATION NO. : 11/260718
DATED           : September 9, 2008
INVENTOR(S)     : Youichi Katahira It is certified that error appears in the above-identified patent and that said Letters Patent is hereby corrected as shown below:

Title Page:
Item (73) Assignee, delete "NSK Steering Systems Co., Ltd." and insert -- NSK Ltd. --.

Signed and Sealed this

Fifteenth Day of June, 2010

David J. Kappos
*Director of the United States Patent and Trademark Office*